(12) United States Patent
Timmer

(10) Patent No.: US 7,340,027 B2
(45) Date of Patent: Mar. 4, 2008

(54) METAL ARTIFACT CORRECTION IN COMPUTED TOMOGRAPHY

(75) Inventor: Jan Timmer, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 289 days.

(21) Appl. No.: 10/564,571

(22) PCT Filed: Jul. 16, 2004

(86) PCT No.: PCT/IB2004/002325

§ 371 (c)(1),
(2), (4) Date: Jan. 13, 2006

(87) PCT Pub. No.: WO2005/008586

PCT Pub. Date: Jan. 27, 2005

(65) Prior Publication Data

US 2006/0227928 A1    Oct. 12, 2006

Related U.S. Application Data

(60) Provisional application No. 60/488,632, filed on Jul. 18, 2003.

(51) Int. Cl.
*A61B 6/03* (2006.01)

(52) U.S. Cl. .......................... 378/4; 378/901; 382/131
(58) Field of Classification Search .................. 378/4, 378/8, 901; 382/131
See application file for complete search history.

(56) References Cited

U.S. PATENT DOCUMENTS

| | | | |
|---|---|---|---|
| 4,272,820 A | 6/1981 | Lux | 364/414 |
| 4,590,558 A | 5/1986 | Glover et al. | 364/414 |
| 5,229,934 A | 7/1993 | Mattson et al. | 364/413.21 |
| 5,243,664 A | 9/1993 | Tuy | 382/6 |
| 6,035,012 A * | 3/2000 | Hsieh | 378/4 |
| 6,125,193 A | 9/2000 | Han | 382/131 |
| 6,266,388 B1 * | 7/2001 | Hsieh | 378/8 |
| 2001/0028696 A1 * | 10/2001 | Yamada et al. | 378/4 |

OTHER PUBLICATIONS

De Man et al., Metal Streak Artifacts in X-ray Computed Tomography: A Simulation Study, IEEE Nuclear Science Symposium, 1998, vol. 3, pp. 1860-1865.*

(Continued)

*Primary Examiner*—Edward J. Glick
*Assistant Examiner*—John M Corbett

(57) ABSTRACT

An artifact correcting image reconstruction apparatus includes a reconstruction processor (70) that reconstructs acquired projection data (60) into an uncorrected reconstructed image (74). A classifying processor (78) classifies pixels of the uncorrected reconstructed image (74) at least into high, medium, and low density pixel classes. A pixel replacement processor (88) replaces pixels of the uncorrected reconstructed image (74) that are of the high density and low density classes with pixel values of the low density pixel class to generate a synthetic image (90). A forward projecting processor (94) forward projects the synthetic image (90) to generate synthetic projection data (96). A projection replacement processor (100, 110) replaces acquired projection data (60) contributing to the pixels of the high density class with corresponding synthetic projection data (96) to generate corrected projection data (112). The reconstruction processor (70) reconstructs the corrected projection data (112) into a corrected reconstructed image (120).

26 Claims, 5 Drawing Sheets

OTHER PUBLICATIONS

Figure 1:
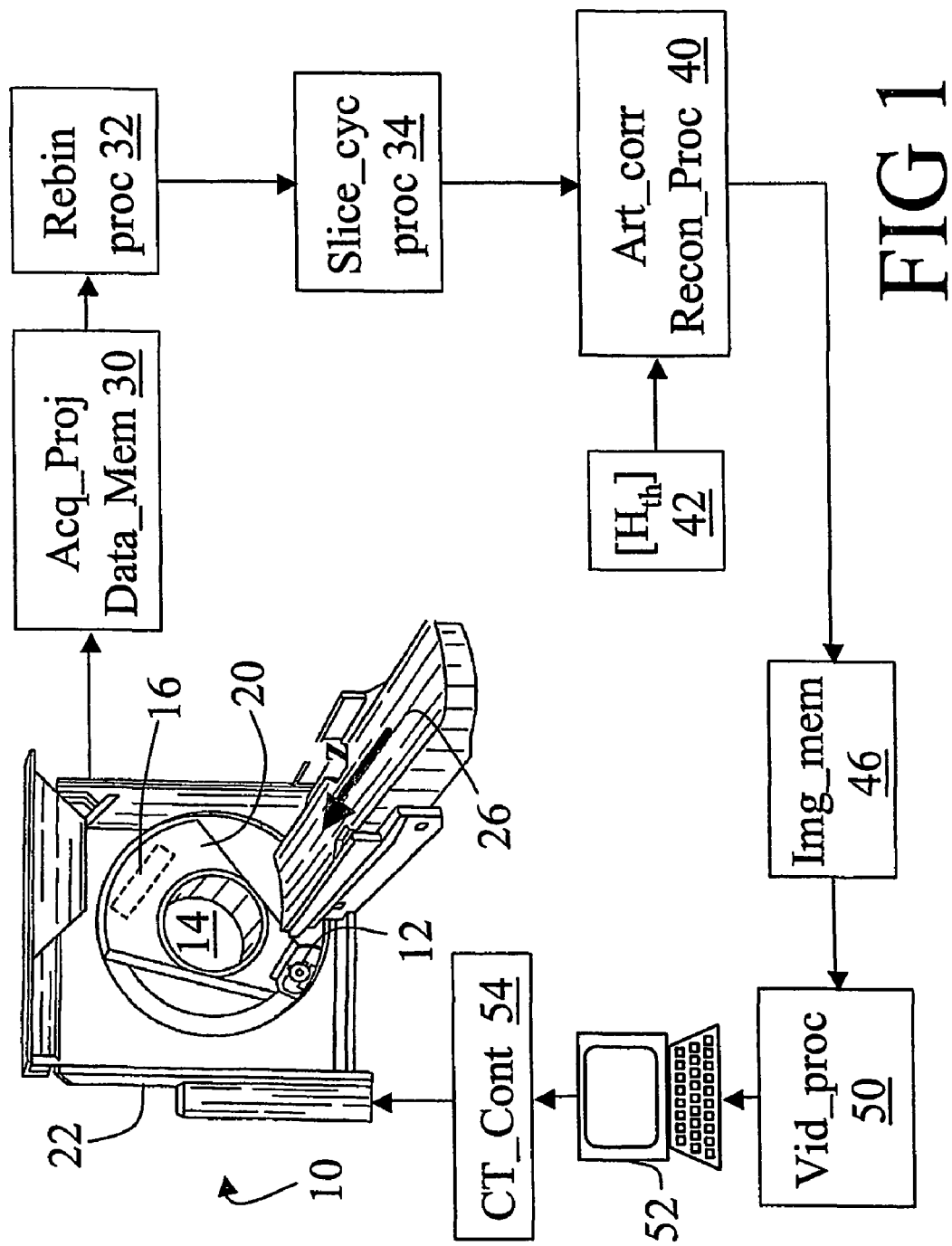

Glover, G.H., et al., An Algorithm for the reduction of metal clip artifacts in CT reconstructions; 1981; Med. Phys.; 8(6)799-807.

Hsieh, J.; A Practical Cone Beam Artifact Correction Algorithm; 2001; IEEE; 2000; pp. 1571-1574.

Joseph, P.M., et al.; A method for simultaneous correction of spectrum hardening artifacts In CT images; 1997; Med. Phys.; 24(10)pp. 1629-1634.

Kalender, W.A., et al.; Reduction of CT Artifacts Caused by Metallic Implants; 1987; Radiology; 164:576-577.

Path, M., et al.; New Approaches in CT Artifact Suppression—A Case Study in Maxillofacial Surgery; Comp. Asst. Radiology, Proc.; 1998; pp. 830-835.

Wei, J., et al.; X-Ray CT high-density artifact suppression in cryosurgery; 2002; Physics in Med. And Biology; 47:N319-N326.

* cited by examiner

METAL ARTIFACT CORRECTION IN COMPUTED TOMOGRAPHY

CROSS REFERENCE TO RELATED APPLICATIONS

This application claims the benefit of U.S. provisional application Ser. No. 60/488,632 filed Jul. 18, 2003, which is incorporated herein by reference.

The following relates to the diagnostic imaging arts. It finds particular application in computed tomography imaging of a subject that includes high density regions such as metal implants, dental fillings, and the like, and will be described with particular reference thereto. However, it also finds application in other types of tomographic imaging such as single photon emission computed tomography (SPECT), positron emission tomography (PET), three-dimensional x-ray imaging, and the like.

In computed tomography imaging, so-called "metal artifacts" arise when the imaged region of interest contains metal implants, dental fillings, or other regions of high radiation absorption. Typically, metal artifacts appear in the reconstructed image as streaks emanating from the high density region. Projection line integrals passing through the regions of high density are highly attenuated leading to substantial measurement errors, and the filtered backprojection or other reconstruction process translates these measurement errors into streaky image artifacts commonly known as metal artifacts.

A previous method for correcting metal artifacts includes performing filtered backprojection to generate an uncorrected reconstructed image, identifying a region of high density in the uncorrected reconstructed image, and replacing projections that pass through the high density region with synthetic projection data having reduced absorption attenuation values. The corrected projection data again undergoes filtered backprojection to produce a corrected reconstructed image.

This known method works well for certain imaging applications in which there is a single, well-defined high density region surrounded by much lower density tissue. It does not work well, however, with a plurality of high density regions, or where there are medium density regions in addition to the high density region. For such composite imaging subjects, metal artifacts are reduced but remain very visible in the corrected reconstructed image, especially between high density and medium density regions. In medical imaging applications, medium density regions typically correspond to bone while high density regions typically correspond to metal implants, dental fillings, operation clips (used in certain interventional computed tomography applications), prosthesis devices, and the like. Hence, in medical computed tomography imaging, the region of interest commonly contains medium density regions.

The present invention contemplates an improved apparatus and method that overcomes the aforementioned limitations and others.

According to one aspect, a method is provided for producing a corrected reconstructed image from acquired tomographic projection data. Acquired projection data corresponding to a region are reconstructed into an uncorrected reconstructed image. Pixels of the uncorrected reconstructed image are classified at least into high density, medium density, and low density pixel classes. Pixels of the uncorrected reconstructed image that are of the high density and low density classes are replaced with pixel values of the low density pixel class to generate a synthetic image. The synthetic image is forward projected to generate synthetic projection data. Acquired projection data contributing to the pixels of the high density class are replaced with corresponding synthetic projection data to generate corrected projection data. The corrected projection data are reconstructed into a corrected reconstructed image.

According to another aspect, an apparatus is disclosed for producing a corrected reconstructed image from acquired tomographic projection data. A reconstructing means is provided for reconstructing acquired projection data corresponding to a region into an uncorrected reconstructed image. A classifying means is provided for classifying pixels of the uncorrected reconstructed image at least into high density, medium density, and low density pixel classes. A pixel replacement means is provided for replacing pixels of the uncorrected reconstructed image that are of the high density and low density classes with pixel values of the low density pixel class to generate a synthetic image. A forward projecting means is provided for forward projecting the synthetic image to generate synthetic projection data. A projection replacement means is provided for replacing acquired projection data contributing to the pixels of the high density class with corresponding synthetic projection data to generate corrected projection data. The reconstructing means reconstructs the corrected projection data into a corrected reconstructed image.

According to yet another aspect, A radiographic scanner is disclosed including a computed tomography scanner and a processor. The scanner includes at least an x-ray source, a detector array, and a rotating gantry on which the x-ray source and the detector array are mounted. The scanner acquires tomographic projection data during rotation of the rotating gantry. The processor produces a corrected reconstructed image from the acquired tomographic projection data. The processor performing a method including: reconstructing acquired projection data corresponding to a region into an uncorrected reconstructed image; classifying pixels of the uncorrected reconstructed image at least into high density, medium density, and low density pixel classes; replacing pixels of the uncorrected reconstructed image that are of the high density and low density classes with pixel values of the low density pixel class to generate a synthetic image; forward projecting the synthetic image to generate synthetic projection data; replacing acquired projection data contributing to the pixels of the high density class with corresponding synthetic projection data to generate corrected projection data; and reconstructing the corrected projection data into a corrected reconstructed image.

One advantage resides in improved artifact correction for images having a plurality of discontinuous regions of metal or other high density material.

Another advantage resides in improved artifact correction for images including a metal or other high density region and a bone or other medium density region.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

FIG. 1 diagrammatically shows a computed tomography imaging system including an artifact-correcting reconstruction processor.

Figure 2:
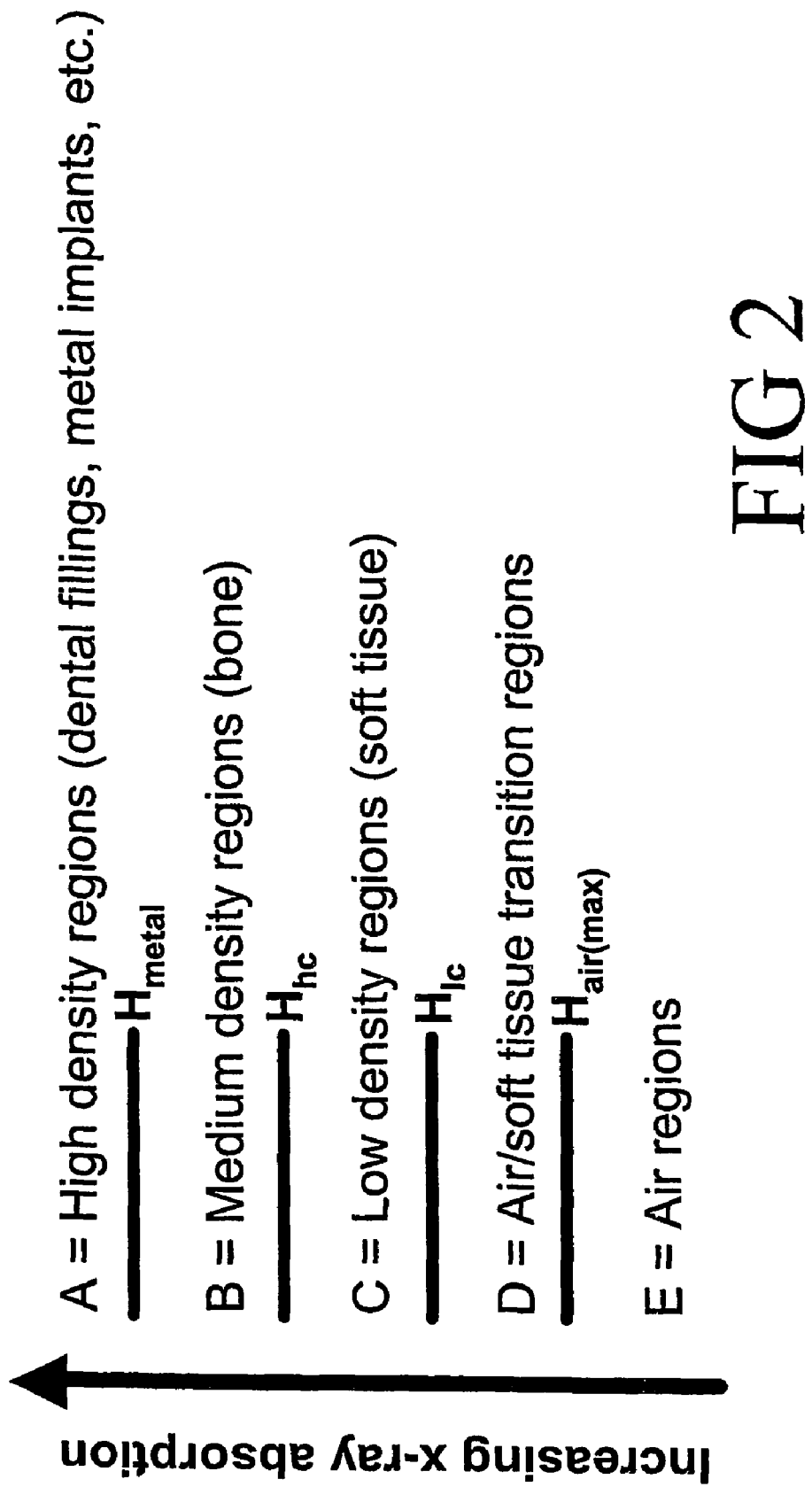

FIG. 2 diagrammatically shows a preferred set of pixel density thresholds defining a preferred set of pixel density classes.

Figure 3:
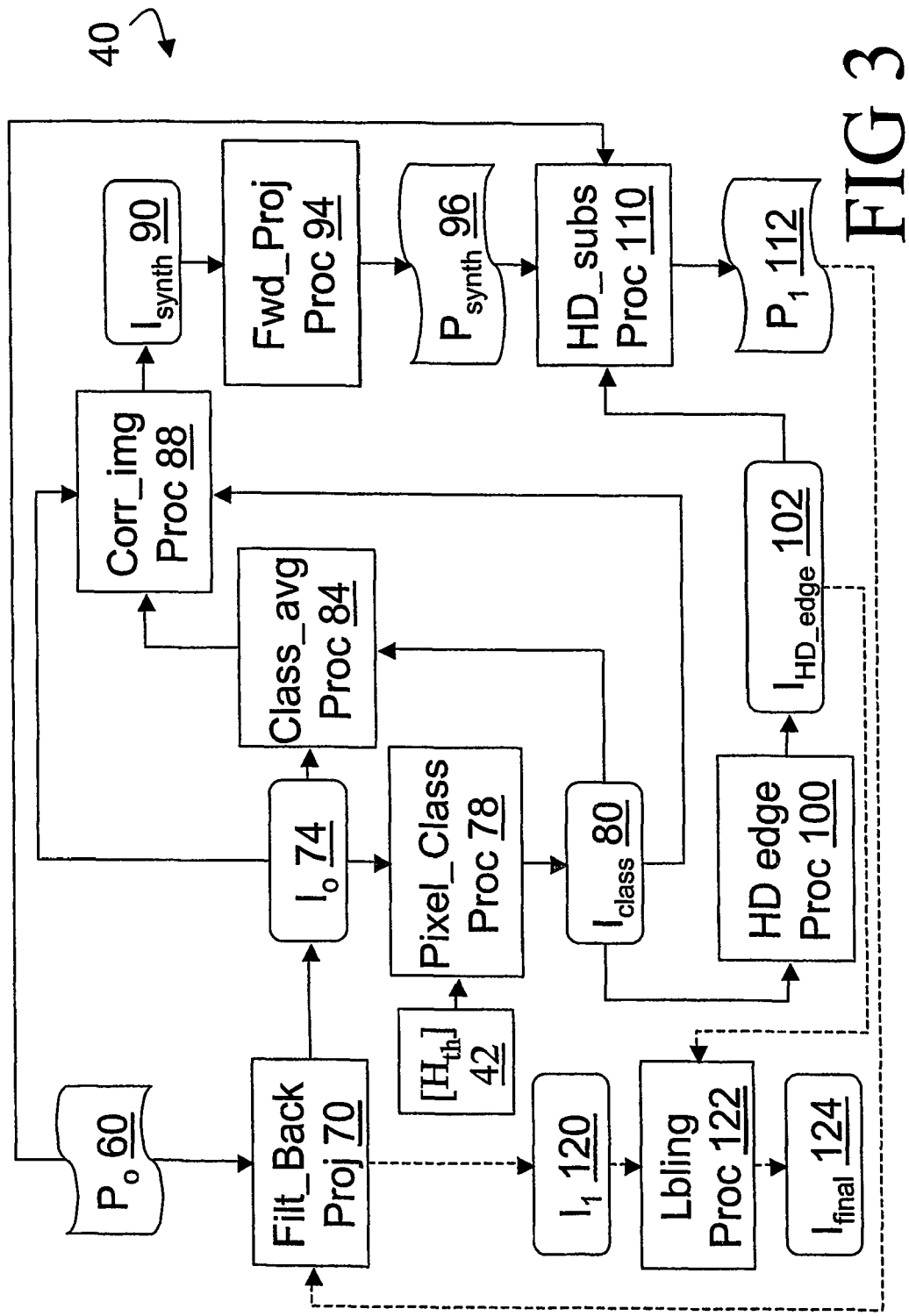

FIG. 3 shows a block diagram of the artifact-correcting reconstruction processor of the computed tomography imaging system of FIG. 1.

Figure 4:
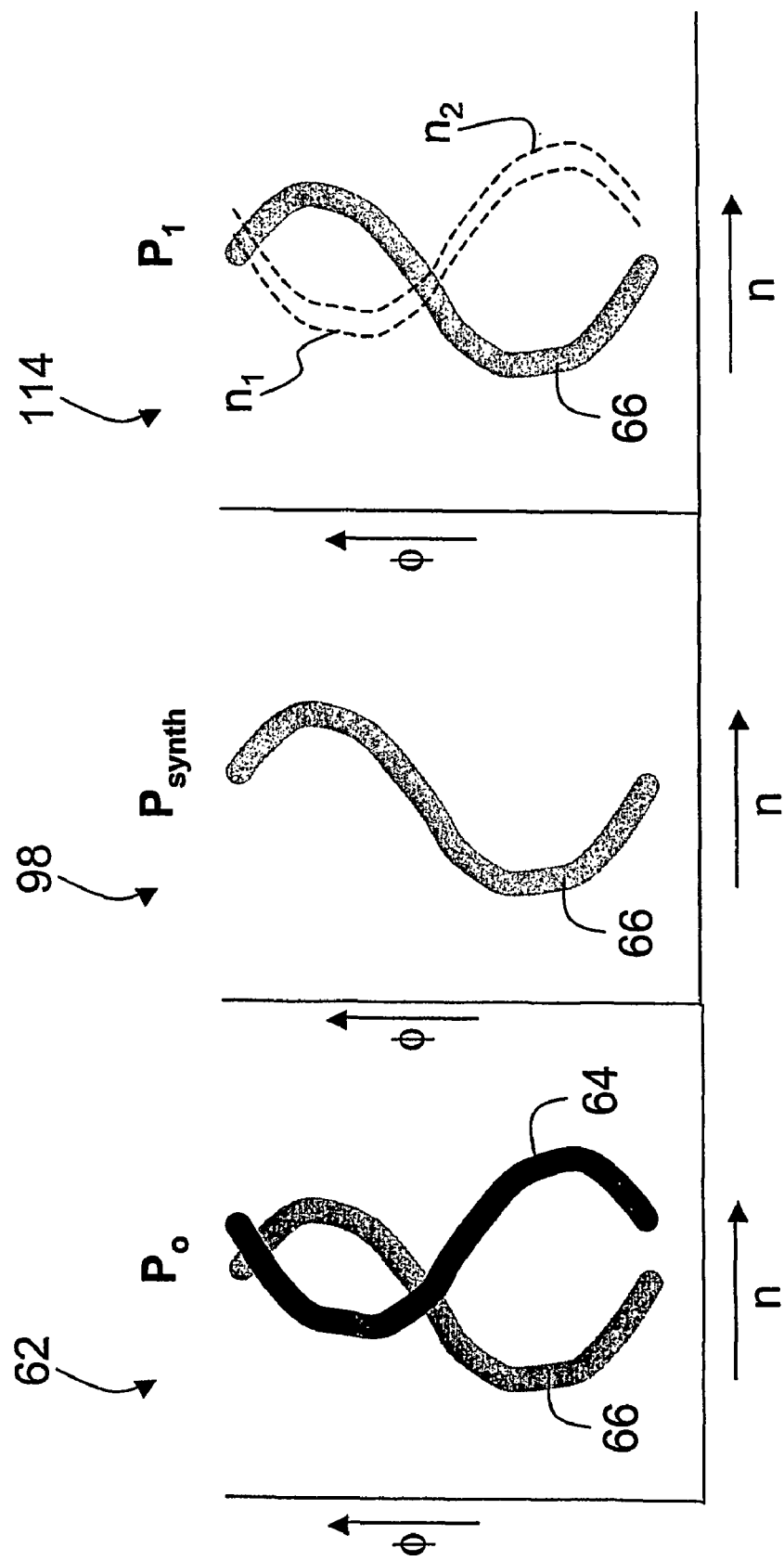

FIG. 4 diagrammatically shows sinogram representations of acquired, modified, and synthetic projection data at several points in the reconstruction processing.

Figure 5:
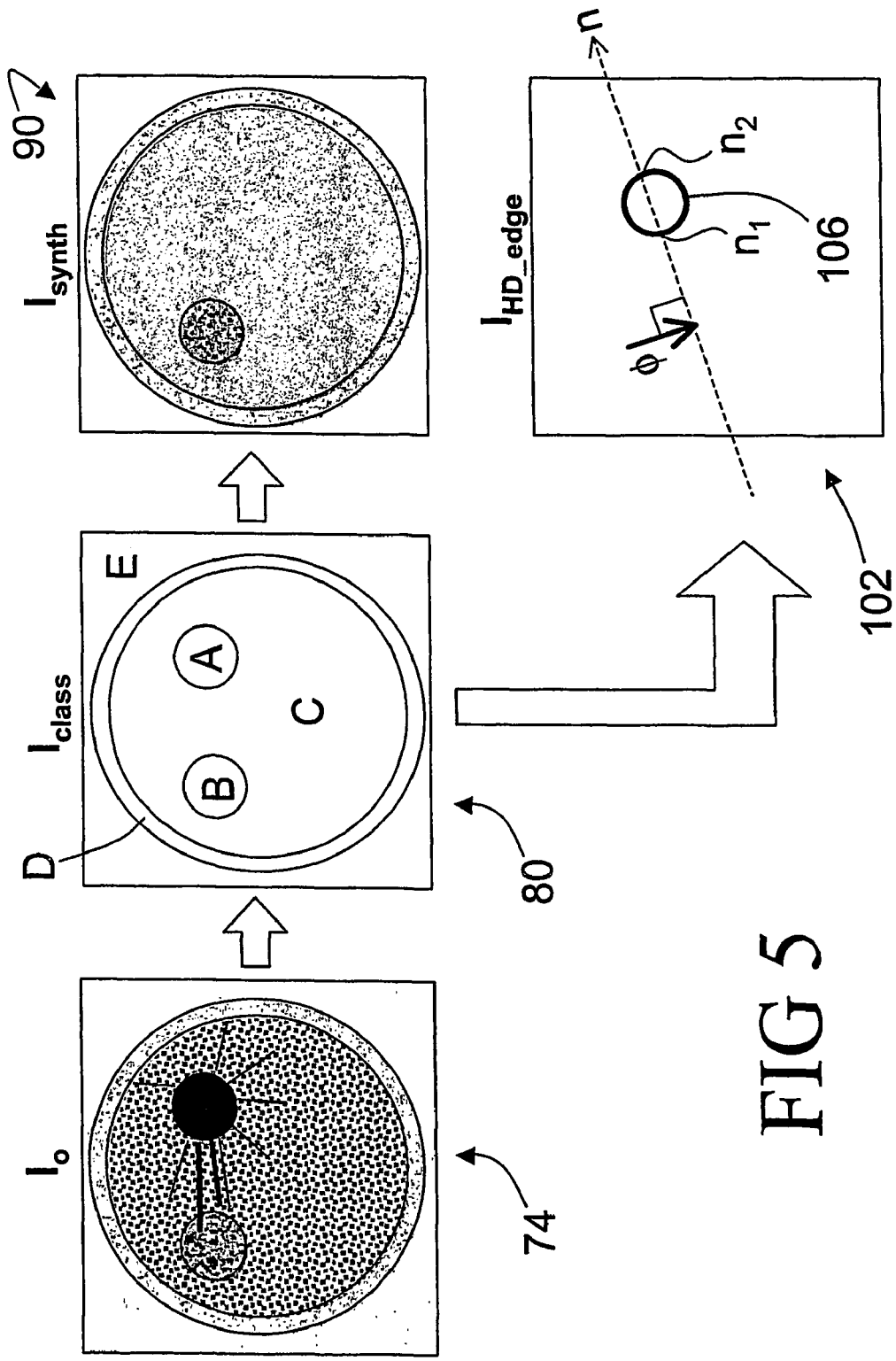

FIG. 5 diagrammatically shows reconstructed and partially processed images at several points during the reconstruction processing.

With reference to FIG. 1, a helical conebeam computed tomography imaging scanner 10 includes a radiation source 12 that produces a radiation beam directed into an examination region 14. The radiation beam interacts with a region of interest of an imaging subject disposed in the examination region 14, producing spatially varying absorption of the radiation as it passes through the examination region. A radiation detector 16 detects the absorption-attenuated radiation after it passes through the examination region 14.

In a preferred embodiment, the radiation source 12 produces a fan-beam or cone-beam of x-rays. The radiation source 12 and the detector 16 are preferably mounted in oppositely facing fashion on a rotating gantry 20 so that the detector continuously receives x-rays from the radiation source. As the source 12 and the detector 16 are revolved about the examination region 14 via the rotating gantry 20, views are acquired over an angular range of preferably about 360° or more. Optionally, a reduced scan of between about 180° and 360° is used. In another suitable embodiment, the detector 16 is replaced by a stationary detector ring mounted on a stationary gantry 22. Typically, a subject support 26 is linearly movable in an axial or z-direction that is generally transverse to a plane of rotation of the rotating gantry 20.

Multiple-slice computed tomography projection data are suitably acquired by performing successive axial scans with the subject support 26 stationary during each axial scan and stepped linearly between axial scans. In this arrangement, the detector 16 can have either a single row of detector elements (that is, a one-dimensional detector) or a two-dimensional array of detector elements. Alternatively, helical computed tomography projection data is suitably acquired during continuous linear movement of the subject support 26 and simultaneous rotating of the gantry 20. This effects helical orbiting of the radiation source 12 relative to an imaging subject disposed on the subject support 26. A generally conical radiation beam and a two-dimensional radiation detector is preferably used for acquiring helical projection data.

The outputs of detector elements of the radiation detector 16 are converted to acquired integrated attenuation projection values $\mu d_o$ that are stored in an acquired projection data memory 30. Each projection datum $\mu d_o$ corresponds to a line integral of attenuation along a line from the radiation source 12 to a corresponding one of the detector elements of the detector 16. The projection data can be represented in a sinogram format in which each two-dimensional slice of the imaged region of interest is represented by a projection data array having coordinates of viewing angle ($\phi$) and line integral index (n).

In the case of a fan-beam, cone-beam, or other original acquisition geometry having non-parallel rays, a rebinning processor 32 optionally rebins the projection data into parallel views. For a cone-beam geometry, such parallel-rebinned views typically include some uncorrected beam divergence in the cone-angle direction. Although parallel rebinning can improve computational efficiency, the artifact correction techniques described herein are typically most effective when performed in the original acquisition geometry, that is, without parallel rebinning. Hence, the parallel rebinning processor 32 is preferably omitted.

For typical fan-beam and cone-beam geometries, the line integral index n suitably corresponds to a detector index indicating a detector element used to measure the projection of index n. It is contemplated, however, that the line integral index n may lack a direct correspondence with detector element number. Such a lack of direct correspondence can result, for example, from interpolation between rebinned projections.

A slice cycling processor 34 cycles through the sinograms corresponding to spatial slices and successively inputs each sinogram into an artifact-correcting reconstruction processor 40. The artifact-correcting reconstruction processor 40 performs a reconstruction in which artifacts introduced by high density regions, such as metal clips, high-density dental fillings, or the like, are substantially corrected, even for images that contain discontinuous high density regions or one or more medium density regions in addition to the one or more high density regions. The artifact-correcting reconstruction processor 40 makes use of a set of pixel density thresholds $[H_{th}]$ 42 to classify pixels of the reconstructed image slice into at least a high density pixel class, a medium density pixel class, and a low density pixel class.

With reference to FIG. 2, in a preferred embodiment the set of density thresholds $[H_{th}]$ 42 include five classes: a high density class designated "A" corresponding to high density regions such as dental fillings, metal implants, and the like; a medium density class designated "B" corresponding to bone or other medium density features; a low density class designated "C" corresponding principally to soft tissues; an air density class designated "E" corresponding to air pockets, ambient air surrounding the imaging subject, or the like; and a transition region designated "D" corresponding to densities intermediate between the low density class "C" and the air density class "E". A high density/medium density threshold $H_{metal}$ defines a minimum density of the high density pixel class "A" and a maximum density of the medium density class "B". A medium density/low density threshold $H_{hc}$ defines a minimum density of the medium density pixel class "B" and a maximum density of the low density class "C". A low density/transition density threshold $H_{lc}$ defines a minimum density of the low density pixel class "C" and a maximum density of the transition density class "D". A transition density/air density threshold $H_{air(max)}$ defines a minimum density of the transition density pixel class "D" and a maximum density of the air density class "E".

Although in the preferred embodiment five density classes "A", "B", "C", "D", "E" are defined, it is also contemplated to omit the transitional density pixel class "D", in which case the low density/transition density threshold $H_{lc}$ is omitted and the threshold $H_{air(max)}$ also defines the minimum density of the low density pixel class "C". In this four-class embodiment, the threshold $H_{air(max)}$ is optionally shifted to a higher density so as to divide the omitted transition pixel class "D" between the low density pixel class "C" and the air density pixel class "E". Still further, the air density pixel class "E" can also be omitted, leaving only the density pixel classes "A", "B", "C", with the transitional and air density pixel classes "D" and "E" subsumed into the low density pixel class "C". Moreover, the density classification system can include more than five density classes to provide improved density resolution.

With returning reference to FIG. 1, for each input slice the artifact-correcting reconstruction processor 40 outputs a two-dimensional artifact-corrected reconstructed image. In multi-slice or helical compute tomography imaging, spatially successive artifact-corrected reconstructed image slices are accumulated in an image memory 46 to define a three-dimensional artifact-corrected reconstructed volume image. If, however, the acquired projection data is limited to a single slice of the region of interest, then the acquired projection data corresponding to the single slice is processed by the artifact-correcting reconstruction processor 40 and the image memory 46 stores a two-dimensional artifact-corrected reconstructed image. Optionally, projection data corresponding to one or more image slices are acquired over a selected time interval to provide a temporal series of artifact-corrected reconstructed image slices or image volumes representative of a temporal evolution of the region of interest.

A video processor 50 processes some or all of the contents of the image memory 46 to create a human-viewable image representation such as a three-dimensional rendering, a selected image slice, a maximum intensity projection, a CINE animation, or the like. The human-viewable image representation is displayed on a user interface 52, which is preferably a personal computer, a workstation, a laptop computer, or the like. Rather than or in addition to displaying an image representation, selected contents of image memory 46 can be printed on paper, stored in a non-volatile electronic or magnetic storage medium, transmitted over a local area network or the Internet, or otherwise processed. In a preferred embodiment, the user interface 52 communicates with a computed tomography imaging scanner controller 54 to enable a radiologist or other operator to control the computed tomography imaging scanner 10 to construct an imaging session, modify an imaging session, execute an imaging session, monitor an imaging session, or otherwise operate the scanner 10.

FIG. 3 shows a block diagram of a preferred embodiment of the artifact-correcting reconstruction processor 40. The input is a projection data set $P_o$ 60 corresponding to a two-dimensional slice of the region of interest of the imaging subject. Preferably, the projection data set 60 includes projection data from a 360° revolution of the radiation source 12 about the examination region 14; however, reconstruction of a reduced projection data set providing, for example, about 180° angular coverage, is also contemplated.

With reference to FIG. 4, a diagrammatic sinogram representation 62 of the acquired projection data set $P_o$ 60 is shown. The ordinate or y-coordinate of the sinogram representation 62 corresponds to view angle φ, while the abscissa or x-coordinate of the sinogram representation 62 corresponds to line integral index n. The sinogram representation 62 includes an exemplary trajectory 64 of a high density region, and an exemplary trajectory 66 of a medium density region. In general, the slice can include an arbitrary number of high density regions and an arbitrary number of medium density regions, as well regions of other classes shown in FIG. 2. The regions produces various corresponding sinogram trajectories that can cross one another.

With returning reference to FIG. 3, a filtered backprojection processor 70 performs filtered backprojection of the projection data set $P_o$ 60 to generate an uncorrected reconstructed image $I_o$ 74. Although filtered backprojection is preferred, the processor 70 can alternatively implement substantially any type of image reconstruction algorithm that is compatible with the geometry of the projection data set $P_o$ 60.

With reference to FIG. 5, as is known in the art, the presence of one or more high density regions in the slice typically causes the uncorrected reconstructed image $I_o$ 74 to include metal artifacts which generally manifest in the image as streaks extending away from the high density region. FIG. 5 shows a diagrammatic representation of an exemplary uncorrected reconstructed image $I_o$ 74 which diagrammatically shows such streaks. The diagrammatic reconstructed images of FIG. 5 are not intended to correspond to images of any particular anatomical structure, but rather diagrammatically illustrate features of the artifact-correcting reconstruction process that are typically observable in image space.

With returning reference to FIG. 3, pixels of the uncorrected reconstructed image $I_o$ 74 are classified by a pixel density classification processor 78 to generate a segmented or pixel density-classified image $I_{class}$ 80 in which pixel values are replaced by density classification index values corresponding to the high, medium, low, transition, and air density pixel classes of FIG. 2. In a preferred embodiment, the pixel density classification processor 78 employs thresholding using the set of thresholds $[H_{th}]$ 42 to classify each pixel of the uncorrected reconstructed image $I_o$ 74 into an appropriate pixel density class.

The pixel density-classified image $I_{class}$ 80 is diagrammatically shown in FIG. 5, where regions of the image essentially consisting of pixels of a particular class are labeled by an appropriate class index selected from the density class indices "A", "B", "C", "D", "E" of FIG. 2. As indicated in FIG. 5, the exemplary image includes a region of high density "A" which could be a metal implant and a region of medium density "B" which could be a region of bone, both contained within a region of low density "C" which could be soft tissue or the like. An annular region of transition density "D" surrounds the region of low density "C", and a region of air density "E" fills the periphery of the pixel density-classified image $I_{class}$ 80, corresponding for example to ambient air surrounding the imaging subject.

Although the exemplary transition region in FIG. 5 is an annular boundary region, the transition density class "D" is not limited to annular boundary regions. the thresholds $H_{lc}$ and $H_{air(max)}$ defining the transition density class "D" are preferably selected so that the transition density class "D" includes air cavities and regions surrounding air cavities inside human subjects. For example, the transition density class "D" preferably includes air cavities in the head such as sinus cavities, the throat, nasal cavities, and the like.

With returning reference to FIG. 3, a density class averaging processor 84 computes an average density value for pixels of the low density class "C". In preferred embodiments which include an air density class, the density class averaging processor 84 also optionally computes an average density value for pixels of the air density class "E". Averaging of the air density class is omitted in the embodiment that employs only three classes and omits the air density class altogether.

A correction image processor 88 selectively replaces selected higher density pixels of the uncorrected reconstructed image $I_o$ 74 with lower density values to produce a synthetic image $I_{synth}$ 90. Specifically, pixels of the uncorrected reconstructed image $I_o$ 74 falling within the high density class "A" as indicated by the pixel density-classified image $I_{class}$ 80 are replaced by the average density value for pixels of the low density class "C". Similarly, pixels falling within the low density class "C" are replaced by the average density value for pixels of the low density class "C". Alternatively, the "A" and "C" class pixels can be replaced with a preselected value or spectrum of values which fall near the center of a nominal "C" density region. If an average density value for pixels of the air density class has been computed, pixels falling within the air density class "E" are suitably replaced by the average density value for pixels of the air density class "E". Pixels of the medium density class "B" are not replaced. If a transition density class "D" has been defined, then pixels of the transition density class "D" are also preferably not replaced.

With reference to FIG. 5, the synthetic image $I_{synth}$ 90 is diagrammatically shown. It will be observed that the synthetic image $I_{synth}$ 90 contains contrast principally due to the regions of medium density "B" and of transition density "D". Regions of high density "A" are effectively removed from the synthetic image $I_{synth}$ 90 by replacing pixels in these regions with the average density value for pixels of the low density class "C". Similarly, image contrast due to density variations in regions of low density "C" are substantially reduced by substitution of these pixels by the average density value for pixels of the low density class "C".

With returning reference to FIG. 3 and with additional reference to FIG. 4, a forward projection processor 94 forward projects the synthetic image $I_{synth}$ 90 to produce synthetic projection data $P_{synth}$ 96. A diagramnmatic sinogram representation 98 of the projection data set $P_{synth}$ 96 is shown in FIG. 4. The sinogram representation 98 retains the exemplary trajectory 66 of the medium density region of the sinogram representation 62, since the pixels of medium density class "B" were not replaced. Similarly, trajectories due to regions of transition class "D" are retained in the synthetic projection data $P_{synth}$ 96 since these pixels are retained in the synthetic image $I_{synth}$ 90. The sinogram representation 98 does not include the exemplary trajectory 64 of the high density region of the sinogram representation 62, however, since the pixels of high density class "A" were replaced by the average density value for pixels of the low density class "C".

In general, the sinogram representation 98 of the synthetic projection data set $P_{synth}$ 96 retains attenuation contributions to the line integrals due to regions of medium density class "B", even if those line integrals additionally have contributions from regions of high density class "A" in the acquired projection data set $P_o$ 60. The forward projection processor 94 preferably projects the synthetic image $I_{synth}$ 90 using a projection geometry corresponding to the geometry of the computed tomography imaging scanner 10.

With continuing reference to FIG. 3, the synthetic projection data set $P_{synth}$ 96 is used for selectively replacing projection data of the acquired projection data set $P_o$ 60 having attenuation contributions from high density regions. A high density region edge finding processor 100 identifies edges of regions essentially consisting of pixels of the high density pixel class. Regions of high density can be identified, for example, by employing a moving analysis window and identifying high density regions as those having more than a selected number of pixels of the high density class within the analysis window. Once a high density region is identified, a suitable edge finding algorithm employs image differentiation or convolution to selectively enhance and identify edges.

In an alternative approach, the edge finding processor 100 performs binary thresholding on the uncorrected reconstructed image $I_o$ 74 using the high density/medium density threshold $H_{metal}$ to produce a binary image having "1" binary values for pixels of the high density class and "0" binary values for other pixels. The binary "1" values are then filtered to remove outlying pixels of value "1" that have few or no neighboring pixels of value "1", and the remaining groups of pixels having value "1" define the high density regions. Edges are then identified in the filtered binary image as "0"-to-"1" binary value transitions, identified for example using an "exclusive-or" binary operator acting on neighboring pixel pairs. Those skilled in the art can readily employ other edge finding algorithms in constructing the edge finding processor 100.

The edge finding processor 100 suitably outputs an edge-enhanced image $I_{HD\_edge}$ 102 that identifies edges of high density regions. The edge-enhanced image $I_{HD\_edge}$ 102 is diagrammatically shown in FIG. 5, where edges 106 of the region of the uncorrected reconstructed image $I_o$ 74 consisting essentially of pixels of the high density class are indicated. In exemplary FIG. 5, the edges 106 define a substantially circular edge; however, the high density regions can have substantially arbitrary shape with substantially arbitrary edges. Typically, the high density regions correspond to dental fillings, metal implants, or other compact discrete objects, and have well-defined edges defining simply-closed geometries.

With reference to FIG. 3, a high density pixel replacement processor 110 selectively replaces projections of the acquired projection data $P_o$ 60 having contributions from high density regions with synthetic projection data from the synthetic projection data set $P_{synth}$ 96 to produce a corrected projection data set $P_I$ 112. In one approach, the high density pixel replacement processor 110 replaces projection data that intersect one or more high density regions identified by the edge-enhanced image $I_{HD\_edge}$ 102 with corresponding projection data from the synthetic projection data set $P_{synth}$ 96. This approach, however, can lead to substantial attenuation discontinuities at transitions between the original acquired projection data $P_o$ 60 and the replacement synthetic projection data set $P_{synth}$ 96.

Hence, in a preferred embodiment, the high density pixel replacement processor 110 interpolates between the acquired projection data and the synthetic projection data at the identified edges 106 of the high density image region. A suitable interpolating projection replacement formula replaces the acquired projection data of the projection data set $P_o$ 60 with replacement projection data $\mu d_{repl}$ having values given by:

$$\mu d_{rep1}(n) = \mu d_{synth}(n) + a\left(\frac{n_2 - n}{n_2 - n_1}\right) + b\left(\frac{n - n_1}{n_2 - n_1}\right), \quad (1)$$

where $a=[\mu d_o(n_1)-\mu d_{synth}(n_1)]$, $b=[\mu d_o(n_2)-\mu d_{synth}(n_2)]$, index n is the line integral index, indices $n_1$ and $n_2$ are line integral indices of the edges 106 of the high density image region as shown in FIG. 5, $\mu d_o$ indicates acquired projection data of the projection data set $P_o$ 60, and $\mu d_{synth}$ indicates projection data of the synthetic projection data set $P_{synth}$ 96. Projection data in the range $n_1 \leq n \leq n_2$ is replaced in accordance with Equation (1). Review of Equation (1) shows that $\mu d_{repl}(n_1) = \mu d_o(n_1)$ and $\mu d_{repl}(n_2) = \mu d_o(n_2)$, providing a smooth transition at the edges 106.

The interpolative replacement performed by the high density pixel replacement processor 110 operates on each view of the sinogram that includes one or more high density regions. That is, for each view specified by a given viewing angle φ, a given high density region has edges at line integral indices $n_1$, $n_2$ which in general are different for different views of the same high density region. The interpolative replacement is performed for each view using the $n_1$, $n_2$ edge values computed for that view. Moreover, there may be more than one non-contiguous high density region within a given view, with each such non-contiguous high density region having its own $n_1$, $n_2$ edge index values. The interpolative replacement set forth in Equation (1) is repeated for each non-contiguous or non-overlapping high density region.

With reference to FIG. 4, a diagrammatic sinogram representation 114 of the corrected projection data set $P_1$ 112 is shown. Advantageously, the sinogram representation 114 retains the trajectory 66 of the medium density region substantially intact, even where the trajectory 66 of the medium density region crosses the location of the removed trajectory 64 of a high density region (indicated in the diagrammatic sinogram representation 114 by dashed lines representing the edges $n_1$, $n_2$ of the replaced high density region in the views). There are no gaps of low density projections along the trajectory 66 of the medium density region because the synthetic projection data set $P_{synth}$ 96 retains contributions of medium density regions to the integrated attenuation projection values $\mu d_o$ while selectively removing contributions of high density regions to the integrated attenuation projection values $\mu d_o$. Similarly, although not illustrated, a trajectory of a transition density region "D" remains intact even where such a trajectory is crossed by the high density trajectory 66.

The corrected projection data set $P_1$ 112 is input to the filtered backprojection processor 70 which performs filtered backprojection to generate an artifact-corrected reconstructed image 120. Preferably, a labeling processor 122 substitutes pixels defining a preselected label for pixels of the artifact-corrected reconstructed image 120 corresponding to high density regions that were substantially modified by the substitution of interpolated synthetic data. This labeling notifies a radiologist or other user who views a final artifact-corrected reconstructed image 124 that the labeled image regions are substantially modified by the artifact-correcting process. The pixels defining the preselected label can, for example, be pixels having high density values simulating the original high density region. In another approach, the pixels defining the preselected label define a selected pattern, such as a cross-hatch pattern, that is clearly artificial. The final artifact-corrected reconstructed image 124 is stored in the image memory 46 of FIG. 1.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A method for producing a corrected reconstructed image from acquired tomographic projection data, the method including:
  reconstructing acquired projection data corresponding to a region into an uncorrected reconstructed image;
  classifying pixels of the uncorrected reconstructed image at least into high density, medium density, and low density pixel classes;
  replacing pixels of the uncorrected reconstructed image that are of the high density and low density classes with pixel values of the low density pixel class to generate a synthetic image;
  forward projecting the synthetic image to generate synthetic projection data;
  replacing acquired projection data contributing to the pixels of the high density class with corresponding synthetic projection data to generate corrected projection data; and
  reconstructing the corrected projection data into a corrected reconstructed image.

2. The method as set forth in claim 1, wherein the replacing of pixels of the uncorrected reconstructed image that are of the high density and low density classes with pixel values of the low density pixel class includes:
  computing an average value of pixels of the low density pixel class; and
  replacing pixels of the uncorrected reconstructed image that are of the high density and low density classes with the average value of pixels of the low density pixel class.

3. The method as set forth in claim 1, wherein the region is a slice and the uncorrected reconstructed image is a two-dimensional image, the method further including:
  repeating the reconstructing of acquired projection data, the classifying, the replacing of pixels, the forward projecting, the replacing of acquired projection data, and the reconstructing of the corrected projection data for acquired projection data corresponding to each of a plurality of two-dimensional slices; and
  combining the two-dimensional reconstructed images corresponding to the plurality of two-dimensional slices to generate a three-dimensional corrected reconstructed image.

4. The method as set forth in claim 1, wherein the replacing of acquired projection data contributing to the pixels of the high density class with corresponding synthetic projection data includes:
  during the replacing, interpolatively adjusting the synthetic projection data to smooth transitions between the synthetic projection data and the acquired projection data.

5. The method as set forth in claim 1, wherein the replacing of acquired projection data contributing to the pixels of the high density class with corresponding synthetic projection data includes:
  identifying a high density image region substantially comprised of pixels of the high density class; and
  performing the replacing for acquired projection data contributing to the high density image region.

6. The method as set forth in claim 5, wherein the region is a slice, the uncorrected reconstructed image is a two-dimensional image, the acquired projection data is in a sinogram format, and the replacing of acquired projection data contributing to the pixels of the high density class with corresponding synthetic projection data further includes:
  replacing the acquired projection data with replacement projection data $\mu d_{repl}$ having values given by:

$$\mu d_{repl}(n) = \mu d_{synth}(n) + a\left(\frac{n_2 - n}{n_2 - n_1}\right) + b\left(\frac{n - n_1}{n_2 - n_1}\right)$$

where $a=[\mu d_0(n_1) - \mu d_{synth}(n_1)]$, $b=[\mu d_0(n_2) - \mu d_{synth}(n_2)]$, n is a line integral index, indices $n_1$ and $n_2$ are line integral indices corresponding to the edges of the high density image region with replacement being performed for $n_1 \leq n \leq n_2$, $\mu d_0$ indicates acquired projection data, and $\mu d_{synth}$ indicates synthetic projection data.

7. The method as set forth in claim 5, wherein the region is a slice, the uncorrected reconstructed image is a two-dimensional image, the acquired projection data is in a sinogram format, and the replacing of acquired projection data contributing to the pixels of the high density class with corresponding synthetic projection data further includes:

for at least one view of the sinogram corresponding to a view angle, repeating the identifying of a high density image region and the performing of the replacing for acquired projection data contributing to the high density image region for at least two non-contiguous high density image regions.

8. The method as set forth in claim 5, wherein the identifying of a high density image region substantially comprised of pixels of the high density class includes:

applying an edge detection algorithm to identify edges of the high density image region.

9. The method as set forth in claim 8, wherein the performing of the replacing for acquired projection data contributing to the high density image region includes:

interpolating between the acquired projection data and the synthetic projection data adjacent the identified edges of the high density image region.

10. The method as set forth in claim 5, wherein the identifying of a high density image region substantially comprised of pixels of the high density class includes:

performing binary thresholding of the uncorrected reconstructed image using a threshold that assigns a first binary value to pixels of the high density pixel class and that assigns a second binary value to pixels not of the high density pixel class; and identifying edges of the high density image region as transitions from pixels of the first binary value to pixels of the second binary value.

11. The method as set forth in claim 5, further including: superimposing a label on the high density image region.

12. The method as set forth in claim 1, wherein the reconstructing of the acquired projection data and the reconstructing of the corrected projection data each include:

reconstructing the projection data using filtered back-projection.

13. The method as set forth in claim 1, wherein the acquired tomographic projection data is from a computed tomography scanner and is in a cone-beam geometry, and the forward projecting includes:

forward projecting the synthetic image to generate synthetic projection data in the cone-beam geometry.

14. The method as set forth in claim 1, wherein:
the high density pixel class corresponds at least to metallic material;
the medium density pixel class corresponds at least to bone; and
the low density pixel class corresponds at least to soft tissue.

15. The method as set forth in claim 14, wherein:
the classifying of pixels of the uncorrected reconstructed image further includes classifying pixels of the uncorrected reconstructed image into an air density pixel class having a maximum density that is lower than a minimum density of the low density pixel class; and
the replacing of pixels of the uncorrected reconstructed image to generate the synthetic image includes replacing pixels of the uncorrected reconstructed image that are of the air density class with an average value of pixels of the air density pixel class.

16. The method as set forth in claim 15, wherein the classifying of pixels of the uncorrected reconstructed image further includes classifying pixels of the uncorrected reconstructed image into a transition density pixel class spanning a density range between the maximum density of the air density pixel class and the minimum density of the low density pixel class.

17. The method as set forth in claim 1, wherein the replacing of pixels of the uncorrected reconstructed image does not include replacing pixels of the medium density pixel class.

18. An apparatus for producing a corrected reconstructed image from acquired tomographic projection data, the apparatus including:

a reconstructing means for reconstructing acquired projection data corresponding to a region into an uncorrected reconstructed image;

a classifying means for classifying pixels of the uncorrected reconstructed image at least into high density, medium density, and low density pixel classes;

a pixel replacement means for replacing pixels of the uncorrected reconstructed image that are of the high density and low density classes with pixel values of the low density pixel class to generate a synthetic image;

a forward projecting means for forward projecting the synthetic image to generate synthetic projection data; and a projection replacement means for replacing acquired projection data contributing to the pixels of the high density class with corresponding synthetic projection data to generate corrected projection data;

the reconstructing means reconstructing the corrected projection data into a corrected reconstructed image.

19. The apparatus as set forth in claim 18, wherein the projection replacement means includes:

an edge finding means for finding edges of one or more high density regions consisting essentially of pixels of the high density pixel class.

20. The apparatus as set forth in claim 19, wherein the projection replacement means further includes:

an interpolating replacement means for interpolatively replacing acquired projection data with synthetic projection data at the edges of the high density regions.

21. The apparatus as set forth m claim 19, further including:

a labeling processor for substituting pixels defining a preselected label for pixels of the corrected reconstructed image corresponding to the one or more high density regions.

22. The apparatus as set forth in claim 18, wherein the classifying means accesses a set of threshold values including at least:

a medium density/high density threshold value defining a minimum density of the high density pixel class and a maximum density of the medium density pixel class, and a low density/medium density threshold value defining a minimum density of the medium density pixel class and a maximum density of the low density pixel class; and the classifying means classifying pixels of the uncorrected reconstructed image at least into high density, medium density, and low density pixel classes based on comparison of pixel values with the set of threshold values.

23. The apparatus as set forth in claim 22, wherein the set of threshold values further include:

a low density/transition density threshold defining a minimum density of the low density pixel class and a maximum density of a transition density pixel class, and a transition density/air density threshold defining a minimum density of the transition density pixel class and a maximum density of an air density pixel class, wherein the classifying means further classifies pixels of the uncorrected reconstructed image into transition density and air density pixel classes based on comparison of pixel values with the set of threshold values.

24. The apparatus as set forth in claim 23, wherein the pixel replacement means further replaces pixels of the uncorrected reconstructed image that are of the air density pixel class with an average value of pixels of the air density pixel class.

25. The apparatus as set forth in claim 18, further including:

a means for acquiring the acquired tomographic projection data, the means for acquiring including at least an x-ray source, a detector array, and a rotating gantry on which the x-ray source and the detector array are mounted, the acquired tomographic projection data being acquired during rotation of the rotating gantry.

26. A radiographic scanner including:

a computed tomography scanner including at least an x-ray source, a detector array, and a rotating gantry on which the x-ray source and the detector array are mounted, the scanner acquiring tomographic projection data during rotation of the rotating gantry; and a processor configured to produce a corrected reconstructed image from the acquired tomographic projection data, the processor configured to perform a method including:

reconstructing acquired projection data corresponding to a region into an uncorrected reconstructed image, classifying pixels of the uncorrected reconstructed image at least into high density, medium density, and low density pixel classes, replacing pixels of the uncorrected reconstructed image that are of the high density and low density classes with pixel values of the low density pixel class to generate a synthetic image, forward projecting the synthetic image to generate synthetic projection data, replacing acquired projection data contributing to the pixels of the high density class with corresponding synthetic projection data to generate corrected projection data, and reconstructing the corrected projection data into a corrected reconstructed image.

* * * * *